(12) United States Patent
Araki et al.

(10) Patent No.: US 10,371,256 B2
(45) Date of Patent: Aug. 6, 2019

(54) VEHICLE LOCK-UP CLUTCH CONTROL DEVICE AND LOCK-UP CLUTCH CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Toshimitsu Araki, Ebina (JP); Seiji Kasahara, Atsugi (JP); Hideshi Wakayama, Hadano (JP); Kouji Saitou, Machida (JP); Hiroyasu Tanaka, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/753,705

(22) PCT Filed: Aug. 12, 2016

(86) PCT No.: PCT/JP2016/073703
§ 371 (c)(1),
(2) Date: Feb. 20, 2018

(87) PCT Pub. No.: WO2017/033760
PCT Pub. Date: Mar. 2, 2017

(65) Prior Publication Data
US 2018/0245688 A1 Aug. 30, 2018

(30) Foreign Application Priority Data
Aug. 24, 2015 (JP) ................................ 2015-165065

(51) Int. Cl.
*F16H 61/14* (2006.01)
*F16H 59/14* (2006.01)
(Continued)

(52) U.S. Cl.
CPC .......... *F16H 61/143* (2013.01); *F16H 59/14* (2013.01); *B60Y 2300/421* (2013.01);
(Continued)

(58) Field of Classification Search
CPC .... F16H 59/14; F16H 2059/147; F16H 61/14; F16H 61/143; F16H 2061/0087;
(Continued)

(56) References Cited

U.S. PATENT DOCUMENTS

2002/0082140 A1\* 6/2002 Suehiro .................. F16H 59/14
477/115
2009/0259375 A1\* 10/2009 Runde ................... F16H 61/143
701/59

(Continued)

FOREIGN PATENT DOCUMENTS

| JP | 2002-295529 A | 10/2002 |
| JP | 2010-286040 A | 12/2010 |
| JP | 2012-241745 A | 12/2012 |

*Primary Examiner* — Edwin A Young
(74) *Attorney, Agent, or Firm* — Foley & Lardner LLP

(57) ABSTRACT

In a vehicle on which a torque converter having a lock-up clutch is mounted between an engine and a transmission, a meet point learning controller is provided to perform learning control for obtaining a learning value based on information on a meet point at which the lock-up clutch starts torque transmission. The meet point learning controller estimates a LU transmission torque based on a difference between an engine torque signal value and a torque converter transmission torque when the lock-up clutch moves from a non-engaged state to an engaged state during traveling of the vehicle, and uses, as the meet point information, a meet point detection pressure at a time when the LU transmission torque estimated value is determined to have entered an upward trend.

6 Claims, 6 Drawing Sheets

(51) Int. Cl.
  *F16H 61/00* (2006.01)
  *F16D 48/02* (2006.01)
  *F16H 59/42* (2006.01)
  *F16H 59/44* (2006.01)

(52) U.S. Cl.
  CPC .............. *F16D 48/02* (2013.01); *F16H 59/42* (2013.01); *F16H 59/44* (2013.01); *F16H 2059/147* (2013.01); *F16H 2061/0087* (2013.01); *F16H 2061/146* (2013.01)

(58) Field of Classification Search
  CPC ......... F16H 2061/009; F16H 2061/146; B60Y 2300/421
  See application file for complete search history.

(56) References Cited

U.S. PATENT DOCUMENTS

2012/0143453 A1* 6/2012 Nagami ................ F16H 61/143
  701/68
2013/0296123 A1* 11/2013 Doering ................ B60W 10/02
  477/5

\* cited by examiner

VEHICLE LOCK-UP CLUTCH CONTROL DEVICE AND LOCK-UP CLUTCH CONTROL METHOD

TECHNICAL FIELD

The present invention relates to a vehicle lock-up clutch control device and lock-up clutch control method in which learning control is performed for obtaining a learning value based on information on a meet point at which a lock-up clutch starts torque transmission.

BACKGROUND ART

Heretofore, a learning method, in which a comparison between an engine speed and a clutch input speed, when gradually engaging a start-up clutch, is made, and then the hydraulic pressure supplied to the clutch at the time when the clutch input speed has dropped by a predetermined revolution speed with respect to the engine speed is learned as a torque transmission point, is generally known (for instance, see Patent document 1).

Recently, in a lock-up clutch incorporated in a torque converter, both of a rapid engagement for improved fuel economy and a reduction of unnatural feeling that the driver experiences uncomfortable fluctuations of vehicle behavior when engaging the lock-up clutch are required. For this reason, learning of a torque transmission point has been studied even in a lock-up clutch. For instance, application of learning control for a start-up clutch, as disclosed in the Patent document 1, would be considered.

However, assuming that torque-transmission-point learning control for a lock-up clutch is performed during traveling for the purpose of ensuring a learning frequency, there is a case where the engine speed fluctuates irrespective of an engaged state of the lock-up clutch. That is, there is a possibility of erroneous learning.

It is, therefore, in view of the previously-described drawbacks of the prior art, an object of the invention to provide a vehicle lock-up clutch control device and lock-up clutch control method in which erroneous learning is prevented while ensuring a learning frequency, when performing learning control based on information on a meet point at which a lock-up clutch starts torque transmission.

CITATION LIST

Patent Literature

Patent document 1: Japanese Patent Provisional Publication No. JP2002-295529

SUMMARY OF INVENTION

In order to accomplish the aforementioned and other objects, in the present invention, a torque converter having a lock-up clutch between an engine and a transmission is mounted on a vehicle. The vehicle is provided with a lock-up controller that performs engagement control for the lock-up clutch and a meet point learning controller that performs learning control for obtaining a learning value based on information on a meet point at which the lock-up clutch starts torque transmission. The meet point learning controller estimates a lock-up transmission torque based on a difference between an engine torque and a torque converter transmission torque when the lock-up clutch moves from a non-engaged state to an engaged state during traveling of the vehicle, and uses, as the meet point information, a meet point detection hydraulic pressure at a time when the lock-up transmission torque estimated value is determined to have entered an upward trend.

The lock-up transmission torque is estimated based on the difference between the engine torque and the torque converter transmission torque when the lock-up clutch moves from a non-engaged state to an engaged state during traveling of the vehicle. The meet point detection hydraulic pressure at the time when the lock-up transmission torque estimated value is determined to have entered an upward trend is used as the meet point information for meet point learning control. That is to say, due to engine speed fluctuations during traveling, the torque converter transmission torque changes and thus the transmission torque of the lock-up clutch also changes. In contrast, the meet point detection hydraulic pressure is a hydraulic pressure at the time when the lock-up transmission torque estimated value, which is estimated based on the difference between the engine torque and the torque converter transmission torque, has entered an upward trend, that is, a hydraulic pressure such that the transmission torque of the lock-up clutch falls no longer. In this manner, the meet point detection hydraulic pressure at the time when the lock-up transmission torque estimated value is determined to have entered an upward trend is used as the meet point information based on which the learning value is determined, and hence erroneous learning is prevented. Also, when the lock-up clutch experiences lock-up engagement control that the lock-up clutch moves from a non-engaged state to an engaged state during traveling, meet point learning control processing is initiated. As a result of this, when learning control is performed based on the meet point information at which the lock-up clutch starts torque transmission, it is possible to prevent erroneous learning while ensuring a learning frequency.

DESCRIPTION OF EMBODIMENTS

The preferred embodiments, which realize a vehicle lock-up clutch control device and lock-up clutch control method according to the invention are hereinafter explained in detail with reference to the drawings showing the first embodiment.

First Embodiment

First of all, the system configuration is explained. The lock-up clutch control device and lock-up clutch control method of the first embodiment is applied to an engine vehicle on which a lock-up clutch equipped torque converter and a continuously variable transmission are mounted. The configuration of the lock-up clutch control device of the engine vehicle of the first embodiment is hereunder explained, while classifying into "OVERALL SYSTEM CONFIGURATION" and "MEET POINT LEARNING CONTROL PROCESSING CONFIGURATION".

[Overall System Configuration]

Figure 1:
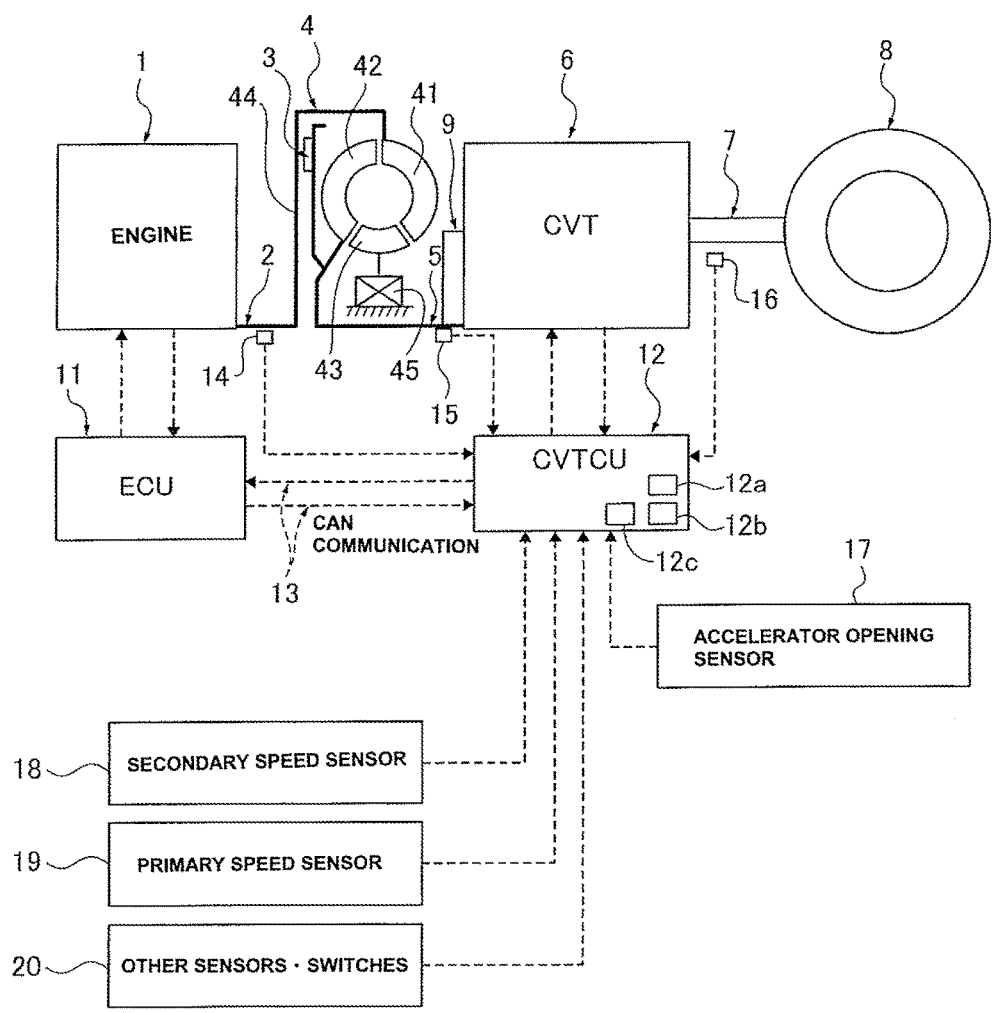
FIG. 1 is an overall system diagram illustrating an engine vehicle to which a lock-up clutch control device and lock-up clutch control method of a first embodiment is applied.

Referring to FIG. 1, there is shown the overall system diagram illustrating the engine vehicle to which the lock-up clutch control device and lock-up clutch control method of the first embodiment is applied. The overall system configuration is hereunder described in reference to FIG. 1.

As shown in FIG. 1, a vehicle drive system is provided with an engine 1, an engine output shaft 2, a lock-up clutch 3, a torque converter 4, a transmission input shaft 5, a continuously variable transmission 6 (a transmission), a drive shaft 7, and a drive road wheel 8.

The above-mentioned lock-up clutch 3 is built in the torque converter 4, and configured such that engine 1 and continuously variable transmission 6 are connected to each other through the torque converter 4 by releasing the lock-up clutch, and that engine output shaft 2 and transmission input shaft 5 are connected directly to each other by engaging the lock-up clutch. An engagement, a slip-engagement, and a release state of lock-up clutch 3 is controlled by a LU actual hydraulic pressure produced based on a LU command pressure from a CVT control unit 12 (described later). Also mounted on the transmission input shaft 5 is an oil pump 9, which is driven by a driving force transmitted from the engine 1 through the torque converter 4 to the transmission input shaft.

The above-mentioned torque converter 4 has a pump impeller 41, a turbine runner 42 opposed to the pump impeller 41, and a stator 43 located between the pump impeller 41 and the turbine runner 42. Torque converter 4 is a fluid coupling in which working oil contained in the hollow space of the torque converter circulates through respective blades of pump impeller 41, turbine runner 42, and stator 43, thereby permitting torque transmission. The internal surface of pump impeller 41 is fixedly connected to the engine output shaft 2 via a converter cover 44, which is an engagement surface of lock-up clutch 3. Turbine runner 42 is connected to the transmission input shaft 5. Stator 43 is mounted on a stationary member, such as a transmission case, through a one-way clutch 45.

The above-mentioned continuously variable transmission 6 is a belt-type continuously variable transmission in which a transmission ratio (a pulley ratio) is steplessly variable by changing respective belt contact diameters of a primary pulley and a secondary pulley. The transmission output speed after having been speed-changed is transmitted through the drive shaft 7 to the drive road wheel 8.

As shown in FIG. 1, a vehicle control system is provided with an engine control unit 11 (ECU), the CVT control unit 12 (CVTCU), and a CAN (Controller Area Network) communication line 13. As sensors for obtaining input information, an engine speed sensor 14, a turbine speed sensor 15 (=CVT input speed sensor), a CVT output speed sensor 16 (=vehicle speed sensor), an accelerator opening sensor 17, a secondary speed sensor 18 (a secondary pulley revolution speed sensor), a primary speed sensor 19 (a primary pulley revolution speed sensor), and other sensors and switches 20 are provided.

The above-mentioned engine control unit 11 is configured to perform various kinds of control for the engine 1, such as fuel injection control and fuel-cut control for engine 1. Additionally, an engine torque signal is generated within the engine control unit 11, based on a specified characteristic for engine 1 showing the relationship between an engine speed and an engine torque, and latest up-to-date information about engine speed and fuel injection amount. In response to a request from the CVT control unit 12, the engine control unit 11 provides and outputs information on the engine torque signal to the CVT control unit 12.

The above-mentioned CVT control unit 12 is configured to perform various kinds of control, such as shift control for controlling a transmission ratio of continuously variable transmission 6, and lock-up clutch control for switching among an engagement, a slip-engagement, and a release state of lock-up clutch 3. The CVT control unit 12 is further configured to perform meet point learning control for obtaining a meet point learning value (LU command pressure) at which the lock-up clutch 3 starts torque transmission when engaging the lock-up clutch 3.

Figure 2:
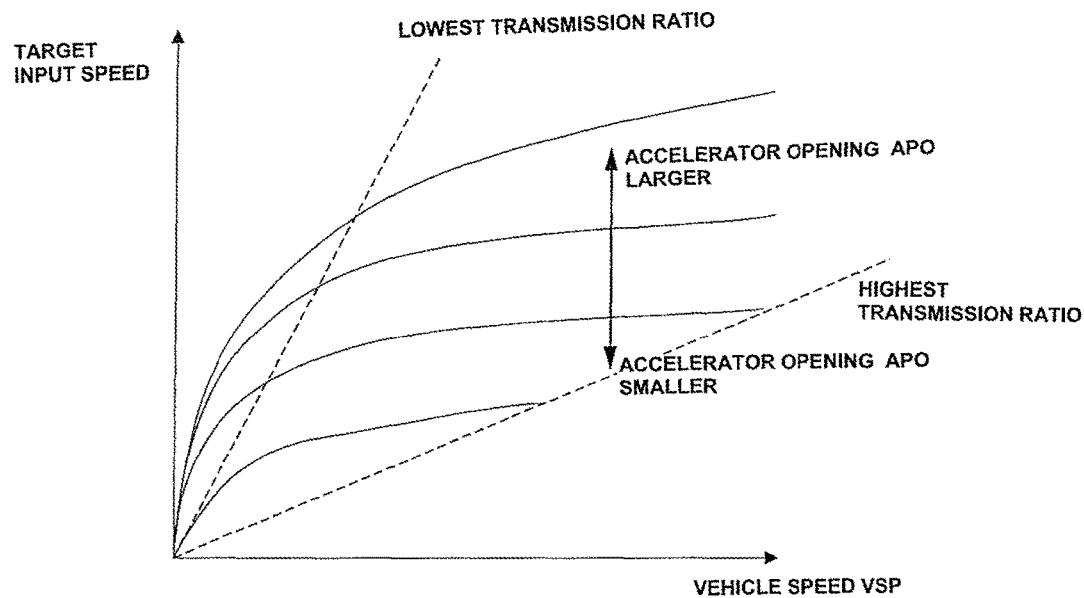
FIG. 2 is a shift map diagram illustrating one example of a shift map used for shift control of a CVT control unit.

Basic control operation of the shift control is performed by a shift controller 12a incorporated in the CVT control unit 12. For instance, by the use of the shift map as shown in FIG. 2, an operating point is determined based on a vehicle speed VSP and an accelerator opening APO. When the operating point moves toward a low transmission ratio side or a high transmission ratio side, the shift controller 12a outputs a shift instruction, so as to execute control in which the transmission ratio is varied for attaining a target input revolution speed (=target primary speed).

Figure 3:
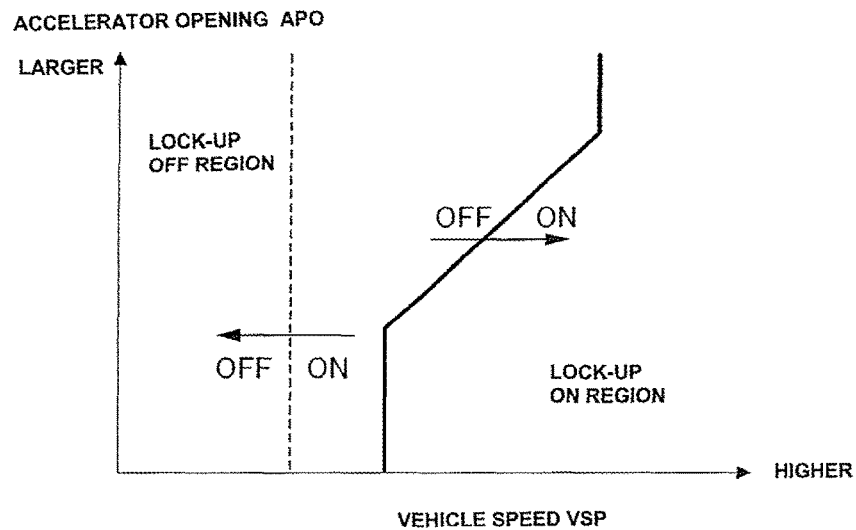
FIG. 3 is a lock-up map diagram illustrating one example of a lock-up map used for lock-up clutch control of the CVT control unit.

Basic control of the lock-up clutch control is performed by a lock-up controller 12b incorporated in the CVT control unit 12, for the purpose of improving fuel economy in a drive traveling state with an accelerator depressed. The basic lock-up control is performed by the use of the lock-up map shown in FIG. 3. That is, when the operating point that is determined based on vehicle speed VSP and accelerator opening APO, crosses an OFFON line of FIG. 3 in a low-speed range, the lock-up controller outputs a LU engagement request for engaging the lock-up clutch 3, which is in a release state. On the other hand, when the operating point that is determined based on vehicle speed VSP and accelerator opening APO, crosses an ON-OFF line of FIG. 3, the lock-up controller outputs a LU release request for releasing the lock-up clutch 3, which is in an engaged state.

The meet point learning control is performed by a meet point learning controller 12c incorporated in the CVT control unit 12. The learning value (the LU command pressure) obtained by the meet point learning control is used as information for determining an initial pressure (=meet point learning value−offset pressure) when the lock-up clutch 3 starts to engage under lock-up clutch control.

[Meet Point Learning Control Processing Configuration]

Figure 4:
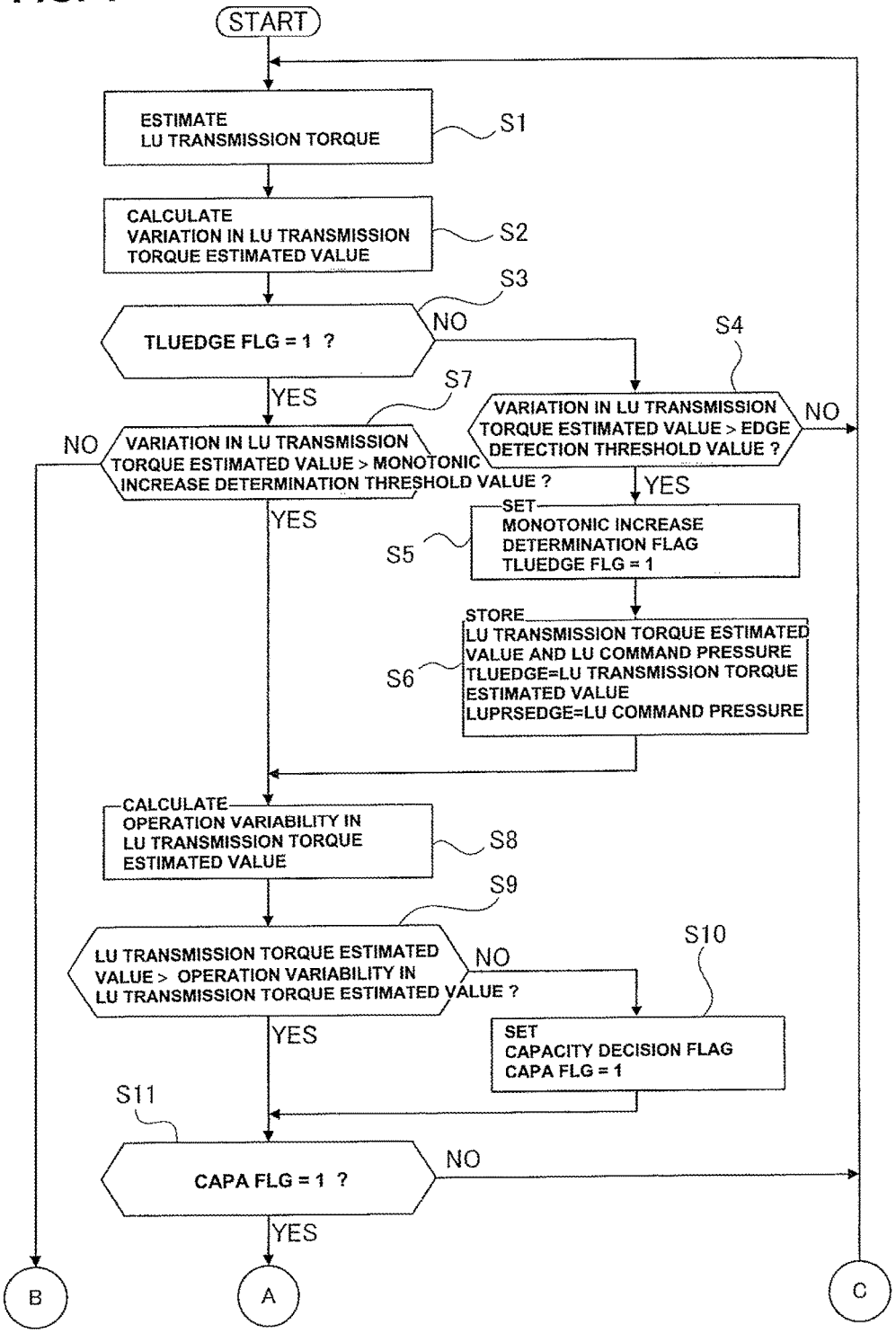
FIG. 4 is a preceding flowchart 1 illustrating a flow of lock-up learning control processing executed within a meet point learning controller of the CVT control unit of the first embodiment.
Figure 5:
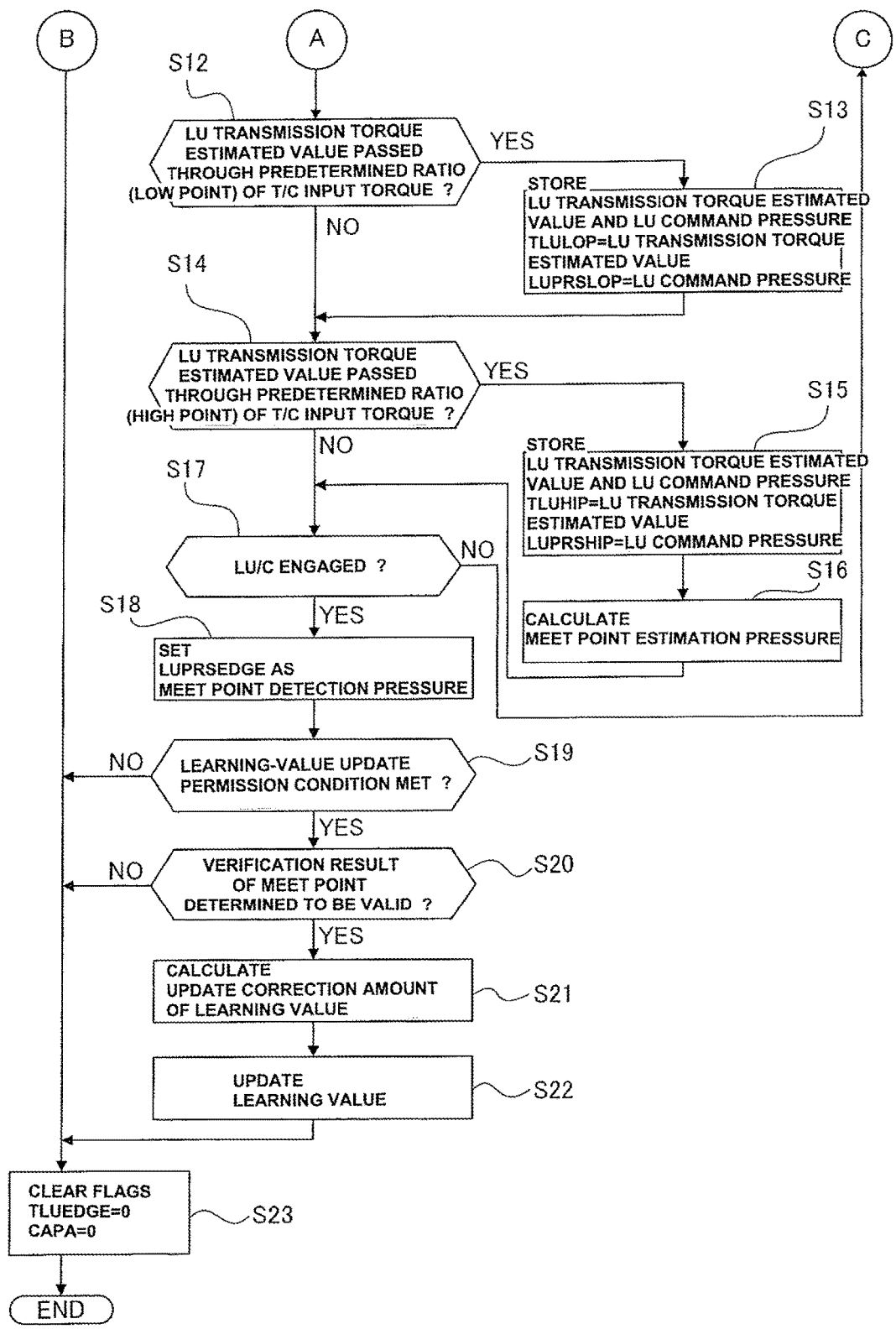
FIG. 5 is a subsequent flowchart 2 illustrating the flow of lock-up learning control processing executed within the meet point learning control unit of the CVT control unit of the first embodiment.

Referring to FIGS. 4 and 5, there is shown the flow of meet point learning control processing (meet point learning control means) executed within the meet point learning controller 12c of the CVT control unit 12 of the first embodiment. Respective steps of FIGS. 4-5, which show the meet point learning control processing configuration, are hereunder explained. The meet point learning control processing is initiated when a LU engagement request is outputted under lock-up clutch control, and executed each time the lock-up clutch experiences LU engagement operation by which the lock-up clutch 3, which is in a release state, is engaged. By the way, regarding abbreviated technical terms in FIGS. 4-5, the term "lock-up" is abbreviated as "LU", the term "lock-up clutch" is abbreviated as "LU/C", and the term "torque converter" is abbreviated as "T/C".

Subsequently to any one of "START", a determination of a variation (an amount of change) in LU transmission torque estimated value≤an edge detection threshold value at step S4, a determination of CAPA=0 at step S11, and a determination of non-engaged LU/C at step S17, at step S1 a LU transmission torque is estimated, and then the routine proceeds to step S2. At this step S1, a LU transmission torque estimated value, which is the estimate of a LU transmission torque, is basically derived from or estimated based on the difference between an engine torque and a torque converter transmission torque. In more detail, the LU transmission torque estimated value is calculated by the following expression.

$$LU \text{ transmission torque estimated value} = Te - \tau \times Ne^2 - OPLOS \quad (1)$$

where:
Te=Engine torque signal value
τ=Torque capacity coefficient (prescribed value)
Ne=Engine speed signal value (from engine speed sensor 14)
OPLOS=Oil pump friction loss torque By the way, the engine torque signal value Te is obtained from the engine control unit 11 in response to a request for information. The torque capacity coefficient τ is given as a value based on the current speed ratio by the use of a speed-ratio versus torque capacity coefficient characteristic. The engine speed signal value Ne is obtained from the engine speed sensor 14. The value ($\tau \times Ne^2$) shown in the expression (1) is a torque converter transmission torque. Also, the oil pump friction loss torque OPLOS is calculated by the following expression.

$$OPLOS = PL \times (O/P \text{ inherent discharge flow rate}) + Ne \times (\text{Engine speed dependent coefficient}) \quad (2)$$

where:
PL=Line pressure
O/P inherent discharge flow rate=O/P discharge flow rate (per one revolution) of oil pump on the rotation axis of the engine
Engine speed dependent coefficient=a coefficient calculated by a specific coefficient expression, which is obtained by an experiment or the like Subsequently to estimation of the LU transmission torque at step S1, at step S2 a variation in LU transmission torque estimated value is calculated. Then, the routine proceeds to step S3. Hereupon, the variation in LU transmission torque estimated value is defined as a variation in LU transmission torque estimated value per unit time, and thus calculated by the following expression.

Variation of LU transmission torque estimated value=LU transmission torque estimated value (the current value)−LU transmission torque estimated value (the previous value, estimated a prescribed time before)

Subsequently to calculation of the variation in LU transmission torque estimated value at step S2, at step S3 a check is made to determine whether or not a monotonic increase determination flag TLUEDGEFLG is set, that is, TLUEDGEFLG=1. When the answer to step S3 is in the affirmative (YES), that is, TLUEDGEFLG=1, the routine proceeds to step S7. Conversely when the answer to step S3 is in the negative (NO), that is, TLUEDGEFLG=0, the routine proceeds to step S4. Hereupon, the monotonic increase determination flag TLUEDGEFLG is set at step S5, when the variation in LU transmission torque estimated value has exceeded the edge detection threshold value.

Subsequently to the determination of TLUEDGEFLG=0 at step S3, at step S4 a check is made to determine whether or not a variation in LU transmission torque estimated value>an edge detection threshold value is met. When the answer to step S4 is in the affirmative (YES), that is, a variation in LU transmission torque estimated value>an edge detection threshold value, the routine proceeds to step S5. Conversely when the answer to step S4 is in the negative (NO), that is, a variation in LU transmission torque estimated value≤an edge detection threshold value, the routine returns back to step S1. Hereupon, the "edge detection threshold value" is set to a value such that, regarding a variation in LU transmission torque estimated value, the LU transmission torque estimated value can be determined to have entered an upward trend irrespective of any influence of speed fluctuations and torque fluctuations of engine 1 and the like. That is, the edge detection threshold value is set to a value slightly greater than a variation in LU transmission torque estimated value, occurring due to the fluctuations as discussed above.

Subsequently to the determination of a variation in LU transmission torque estimated value>an edge detection threshold value at step S4, at step S5 the monotonic increase determination flag TLUEDGEFLG is set, that is, TLUEDGEFLG=1, and then the routine proceeds to step S6.

Subsequently to setting of monotonic increase determination flag TLUEDGEFLG at step S5, at step S6 a LU transmission torque estimated value TLUEDGE and a LU command value LUPRSEDGE at the time when it is determined that a variation in LU transmission torque estimated value>an edge detection threshold value has been met, are stored. Then, the routine proceeds to step S8.

Subsequently to the determination of TLUEDGEFLG=1 at step S3, at step S7 a check is made to determine whether or not a variation in LU transmission torque estimated value>a monotonic increase determination threshold value is met. When the answer to step S7 is in the affirmative (YES), that is, a variation in LU transmission torque estimated value>a monotonic increase determination threshold value, the routine proceeds to step S8. Conversely when the answer to step S7 is in the negative (NO), that is, a variation in LU transmission torque estimated value≤a monotonic increase determination threshold value, the routine proceeds to step S23. Hereupon, the "monotonic increase determination threshold value" is set to a criterion value for determining that a variation in LU transmission torque estimated value is monotonically increasing. That is, the monotonic increase determination threshold value is set to a value that can exclude a state where an increasing gradient of the LU transmission torque estimated value is low and a state where the LU transmission torque estimated value is levelling off without any increasing trend.

Subsequently to storing of LU transmission torque estimated value TLUEDGE and LU command value LUPRSEDGE at step S6 or the determination of a variation in LU transmission torque estimated value>a monotonic increase determination threshold value at step S7, at step S8 an operation variability in LU transmission torque estimated value is calculated. Hereupon, the "operation variability in LU transmission torque estimated value" is a summed value of a "variability in engine torque signal value Te" and a "variability in torque converter transmission torque ($=\tau \times Ne^2$) caused by a variability in torque capacity coefficient $\tau$".

Subsequently to calculation of the operation variability in LU transmission torque estimated value at step S8, at step S9 a check is made to determine whether or not the LU transmission torque estimated value has been greater than the operation variability in LU transmission torque estimated value. When the answer to step S9 is in the affirmative (YES), that is, a LU transmission torque estimated value>an operation variability in LU transmission torque estimated value, the routine proceeds to step S10. Conversely when the answer to step S9 is in the negative (NO), that is, a LU transmission torque estimated value≤an operation variability in LU transmission torque estimated value, the routine proceeds to step S11. This step S9 is a decision step for deciding that a LU capacity is generating. That is to say, step S9 determines if a transition from the previous state defined by a LU transmission torque estimated value≤an operation variability in LU transmission torque estimated value to the current state defined by a LU transmission torque estimated value>an operation variability in LU transmission torque estimated value has occurred, in other words, the LU transmission torque estimated value has passed through the operation variability in LU transmission torque estimated value. Furthermore, by determining if the LU transmission torque estimated value has passed through the operation variability in LU transmission torque estimated value, it is possible to determine if a clutch meet point (=LU capacity generating point) has been detected below the operation variability in LU transmission torque estimated value.

Subsequently to the determination of a LU transmission torque estimated value>an operation variability in LU transmission torque estimated value at step S9, at step S10 a capacity flag CAPAFLG is set, that is, CAPAFLG=1. Then, the routine proceeds to step S11.

Subsequently to the determination of a LU transmission torque estimated value≤an operation variability in LU transmission torque estimated value at step S9 or setting of capacity flag CAPAFLG at step S10, at step S11 a check is made to determine whether or not the capacity flag CAPAFLG is set (CAPAFLG=1). When the answer to step S11 is in the affirmative (YES), that is, CAPAFLG=1, the routine proceeds to step S12. Conversely when the answer to step S11 is in the negative (NO), that is, CAPAFLG=0, the routine returns back to step S1.

Subsequently to the determination of CAPAFLG=1 at step S11, at step S12 a check is made to determine whether or not the LU transmission torque estimated value has passed through a predetermined ratio (a low point) with respect to a T/C input torque. When the answer to step S12 is in the affirmative (YES), that is, the low point having been passed, the routine proceeds to step S13. Conversely when the answer to step S12 is in the negative (NO), that is, the low point having not yet been passed, the routine proceeds to step S14. Hereupon, the predetermined ratio of the "low point" with respect to the T/C input torque is higher than a ratio at the time of the determination of CAPAFLG=1, and lower than a "high point" (described later). That is, the "low point" is set as a point corresponding to the LU transmission torque estimated value deviated from the "high point" by a predetermined ratio width. By the way, both of the "low point" and the "high point" are set less than or equal to 50% of the T/C input torque.

Subsequently to the determination of the low point having been passed at step S12, at step S13 a LU transmission torque estimated value TLULOP and a LU command value LUPRSLOP at the time when it is determined that the low point has been passed are stored. Then, the routine proceeds to step S14.

Subsequently to the determination of the low point having not yet been passed at step S12 or storing of LU transmission torque estimated value TLULOP and LU command value LUPRSLOP at step S13, at step S14 a check is made to determine whether or not the LU transmission torque estimated value has passed through a predetermined ratio (a high point) with respect to the T/C input torque. When the answer to step S14 is in the affirmative (YES), that is, the high point having been passed, the routine proceeds to step S15. Conversely when the answer to step S14 is in the negative (NO), that is, the high point having not yet been passed, the routine proceeds to step S17. Hereupon, the predetermined ratio of the "high point" with respect to the T/C input torque is higher than the "low point" and less than or equal to 50% of the T/C input torque. That is, the "high point" is set as a point corresponding to the LU transmission torque estimated value deviated from the "low point" by the predetermined ratio width.

Subsequently to the determination of the high point having been passed at step S14, at step S15 a LU transmission torque estimated value TLUHIP and a LU command value LUPRSHIP at the time when it is determined that the high point has been passed are stored. Then, the routine proceeds to step S16.

Subsequently to storing of LU transmission torque estimated value TLUHIP and LU command value LUPRSHIP at step S15, at step S16 a meet point estimation pressure is calculated. Then, the routine proceeds to step S17. Hereupon, the "meet point estimation pressure" is a meet point estimation pressure LUPRSEDGE# corresponding to a LU command value at the time of a meet point and estimated and calculated based on the LU transmission torque estimated value TLULOP and the LU command value LUPRSLOP at the low point and the LU transmission torque estimated value TLUHIP and the LU command value LUPRSHIP at the high point, by the following calculation formula.

$$LUPRSEDGE\#=LUPRSLOP-(LUPRSHIP-LU-PRSLOP)/(TLUHIP-TLULOP)\times(TLULOP-TLUEDGE)$$

The above calculation formula is a formula for calculating a LU command value at a point where, when connecting the low point and the high point, the LU transmission torque estimated value starts to increase.

Subsequently to the determination of the high point having not yet been passed at step S14 or calculation of the meet point estimation pressure at step S16, at step S17 a check is made to determine whether or not the lock-up clutch LU/C has been engaged. When the answer to step S17 is in the affirmative (YES), that is, the lock-up clutch LU/C has been engaged, the routine proceeds to step S18. Conversely when the answer to step S17 is in the negative (NO), that is, the lock-up clutch has not yet engaged, the routine returns back to step S1. Hereupon, the phrase "the lock-up clutch LU/C has been engaged" means a determination of completion of the lock-up clutch LU/C engagement. The determination is made based on whether the LU transmission torque estimated value has reached a specific ratio (for example, a ratio of 80% or more) for determining engagement with respect to the T/C input torque.

Subsequently to the determination of the lock-up clutch LU/C engaged at step S17, at step S18 the LU command value LUPRSEDGE stored at step S6 is set as a meet point detection pressure, and then the routine proceeds to step S19. Hereupon, this meet point detection pressure means a value temporarily set as a LU command value corresponding to a detection pressure at the meet point through the current processing.

Subsequently to temporary setting of the meet point detection pressure at step S18, at step S19 a check is made to determine whether or not a learning-value update permission condition is met. When the answer to step S19 is in the affirmative (YES), that is, the learning-value update permission condition is satisfied, the routine proceeds to step S20. Conversely when the answer to step S19 is in the negative (NO), that is, the learning-value update permission condition is unsatisfied, the routine proceeds to step S23. Hereupon, the learning-value update permission condition includes the following conditions:

Lower-limit predetermined value<Oil temperature<Upper-limit predetermined value (Oil-temperature condition)

Lower-limit predetermined value<Throttle opening<Upper-limit predetermined value (Throttle-opening condition)

Engine torque change width<Torque change threshold value (Engine torque stability condition)

Throttle opening change width<Opening change threshold value (Throttle opening stability condition)

Predetermined value<Engine speed (Oil-amount balance determination condition)

When all of these conditions are satisfied, it is determined that the learning-value update permission condition is satisfied.

Subsequently to the determination of the learning-value update permission condition satisfied at step S19, at step S20 a check is made to determine whether or not a verification result of a meet point is valid. When the answer to step S20 is in the affirmative (YES), that is, the meet point verification result is valid, the routine proceeds to step S21. Conversely when the answer to step S20 is in the negative (NO), that is, the meet point verification result is invalid, the routine proceeds to step S23. Hereupon, the verification of a meet point is made based on whether a specific condition defined by a lower-limit predetermined value<|meet point estimation pressure−meet point detection pressure|<an upper-limit predetermined value is met. Hence, when the absolute value of the difference between the meet point estimation pressure and the meet point detection pressure is within a specific range from the lower-limit predetermined value to the upper-limit predetermined value, the verification result of a meet point is determined to be valid.

Subsequently to the determination of the meet point verification result as valid at step S20, at step S21 an update correction amount of a meet point learning value is calculated, and then the routine proceeds to step S22. Hereupon, the meet point learning value is a value obtained based on the meet point detection pressure (the LU command value stored at step S6). The update correction amount of the meet point learning value is set to a learning correction amount, when the difference (=detected difference) between the current meet point detection pressure and the meet point learning value stored through the previous processing is greater than the learning correction amount. On the other hand, when the difference (=the detected difference amount) between the current meet point detection pressure and the meet point learning value stored through the previous processing is less than or equal to the learning correction amount, the update correction amount of the meet point learning value is set to the detected difference amount. Hereupon, the "learning correction amount" is predefined or preset as a maximum correction amount to be corrected or updated each time one execution of learning correction is experienced.

Subsequently to calculation of the learning-value update correction amount at step S21, at step S22 the meet point learning value is updated, and then the routine proceeds to step S23. Hereupon, the update of the meet point learning value means that the meet point learning value stored at the previous processing is rewritten by a new meet point learning value obtained based on the previous meet point learning value and the learning correction amount, and then the new rewritten learning value is stored.

Subsequently to any one of the determination of a variation in LU transmission torque estimated value a monotonic increase determination threshold value at step S7, the determination of the learning-value update permission condition unsatisfied at step S19, the determination of the meet point verification result as invalid at step S20, and updating of the learning value at step S22, at step S23 flags are cleared to "0". Hereupon, the cleared flags are the monotonic increase determination flag TLUEDGEFLG and the capacity flag (capacity decision flag) CAPAFLG. When TLUEDGE-FLG=1, the flag TLUEDGEFLG is cleared, that is, TLUEDGEFLG=0. When CAPAFLG=1, the flag CAPAFLG is cleared, that is, CAPAFLG=0.

Next, the operation is explained. The operation of the lock-up clutch control device and lock-up clutch control method, which is applied to the engine vehicle of the first embodiment, is hereunder explained, while classifying into "MEET POINT LEARNING CONTROL PROCESSING ACTION", "MEET POINT LEARNING CONTROL ACTION", and "OPERATION PECULIAR TO MEET POINT LEARNING CONTROL".

[Meet Point Learning Control Processing Action]

The meet point learning control processing action of the first embodiment is hereunder described in reference to the flowcharts shown in FIGS. 4 and 5.

When the vehicle starts to travel from a stopped state, the vehicle speed VSP begins to increase, but the monotonic increase determination flag TLUEDGEFLG is still reset, that is, TLUEDGEFLG=0, and the determination of a variation in LU transmission torque estimated value≤an edge detection threshold value is made, immediately after the LU engagement request has been outputted. Therefore, in the flowchart shown in FIG. 4, the flow of step S1→step S2→step S3→step S4 is repeated. During this time period, at step S1 a LU transmission torque is estimated, and at step S2 a variation in LU transmission torque estimated value is calculated.

Thereafter, the variation in LU transmission torque estimated value builds up. Immediately when the determination of a variation in LU transmission torque estimated value>an edge detection threshold value is made through step S4, the routine proceeds from step S4 through steps S5, S6, S8, and S9 to step S11 (see the flow of step S5→step S6→step S8→step S9→step S11). At step S5, the monotonic increase determination flag TLUEDGEFLG is set, that is, TLUEDGEFLG=1, and then at step S6 the LU transmission torque estimated value TLUEDGE and the LU command value LUPRSEDGE at the time when it is determined that a variation in LU transmission torque estimated value>an edge detection threshold value has been met, are stored.

At the next control processing, owing to setting of monotonic increase determination flag TLUEDGEFLG at step S5, that is, TLUEDGEFLG=1, the routine proceeds from step S11 through steps S1, S2, and S3 to step S7 (see the flow of step S1→step S2→step S3→step S7). At step S7 a check is made to determine whether or not a variation in LU transmission torque estimated value>a monotonic increase determination threshold value is met. When a variation in LU transmission torque estimated value>a monotonic increase determination threshold value, the routine proceeds to step S8, and thus the meet point learning processing (meet point learning control processing) is continually executed. Conversely when a variation in LU transmission torque estimated value≤a monotonic increase determination threshold value, the routine proceeds through step S23 to "END" (See the flow of S23→END). This means a situation where there is no trend for the variation in LU transmission torque estimated value to monotonically increase (that is, a situation not suitable for learning that uses a monotonic increase characteristic of the LU transmission torque estimated value), and thus the meet point learning processing (meet point learning control processing) terminates.

While the determination of a variation in LU transmission torque estimated value>a monotonic increase determination threshold value at step S7 is continually made, the routine proceeds from step S7 through step 8 to step S9 (see the flow of step S8→step S9). At step S8 the operation variability in LU transmission torque estimated value is calculated. Then, at step S9 a check is made to determine whether or not the LU transmission torque estimated value has been greater than the operation variability in LU transmission torque estimated value. After this, immediately when step S9 determines that a transition from the state defined by a LU transmission torque estimated value≤an operation variability in LU transmission torque estimated value to the state defined by a LU transmission torque estimated value>an operation variability in LU transmission torque estimated value has occurred, the routine proceeds to step S10. That is, immediately when step S9 determines that a clutch meet point (=LU capacity generating point) has been detected below the operation variability in LU transmission torque estimated value, at step S10 the capacity flag CAPAFLG is set, that is, CAPAFLG=1. At the next step S11, a check is made to determine whether or not the capacity flag CAPAFLG is set (CAPAFLG=1). When CAPAFLG=1, the routine proceeds from step S11 to step S12 of FIG. 5 or later.

At step S12, a check is made to determine whether or not the LU transmission torque estimated value has passed through a predetermined ratio (a low point) with respect to a T/C input torque. When the low point has been passed, the routine proceeds to step S13. At step S13, a LU transmission torque estimated value TLULOP and a LU command value LUPRSLOP at the time when it is determined that the low point has been passed are stored. At step S14 after the low point has been passed, a check is made to determine whether or not the LU transmission torque estimated value has passed through a predetermined ratio (a high point) with respect to the T/C input torque. When the high point has been passed, the routine proceeds to step S15. At step S15, a LU transmission torque estimated value TLULOP and a LU command value LUPRSLOP at the time when it is determined that the high point has been passed are stored. Thereafter, at step S16, a meet point estimation pressure LUPRSEDGE#, which is a LU command value at a point where, when connecting the low point and the high point, the LU transmission torque estimated value starts to increase, is calculated. Then the routine proceeds to step S17. At step S17, a check is made to determine whether or not the lock-up clutch LU/C has been engaged. When the lock-up clutch LU/C engagement has been completed, the routine proceeds to step S18 or later. Conversely when the lock-up clutch LU/C engagement has not yet been completed, the routine returns back to step S1, and thus arithmetic operation of the LU transmission torque estimated value at step S1 and calculation of the variation in LU transmission torque estimated value at step S2 are continually executed until such time it is determined that the lock-up clutch LU/C engagement has been completed.

Immediately when step S17 determines that the lock-up clutch LU/C engagement has been completed, the routine proceeds to step S18. At step S18, the LU command value LUPRSEDGE stored at step S6 is set as a meet point detection pressure. At the next step S19, a check is made to determine whether or not a learning-value update permission condition is met. When step S19 determines that the learning-value update permission condition is unsatisfied, the routine proceeds through step S23 to "END" (See the flow of S23→END). In this case, there is a high possibility of erroneous learning of the meet point learning value, and thus the meet point learning processing is terminated. In contrast, when step S19 determines that the learning-value update permission condition is satisfied, the routine proceeds to step S20. At step S20, a check is made to determine whether or not a verification result of a meet point is valid. When step S20 determines that the meet point verification result is invalid, the routine proceeds through step S23 to "END" (See the flow of S23→END). Also, in this case, there is a high possibility of erroneous learning of the meet point learning value, and thus the meet point learning processing is terminated.

When step S19 determines that the learning-value update permission condition is satisfied and step S20 determines that the meet point verification result is valid, the routine proceeds from step S20 through steps S21, S22, and S23 to "END" (see the flow of step S20→step S21→step S22→step S23→END). Thus, the meet point learning value is updated. That is, at step S21 an update correction amount of the meet point learning value is calculated, and then at the next step S22 the meet point learning value is updated.

[Meet Point Learning Control Action]

Figure 6:
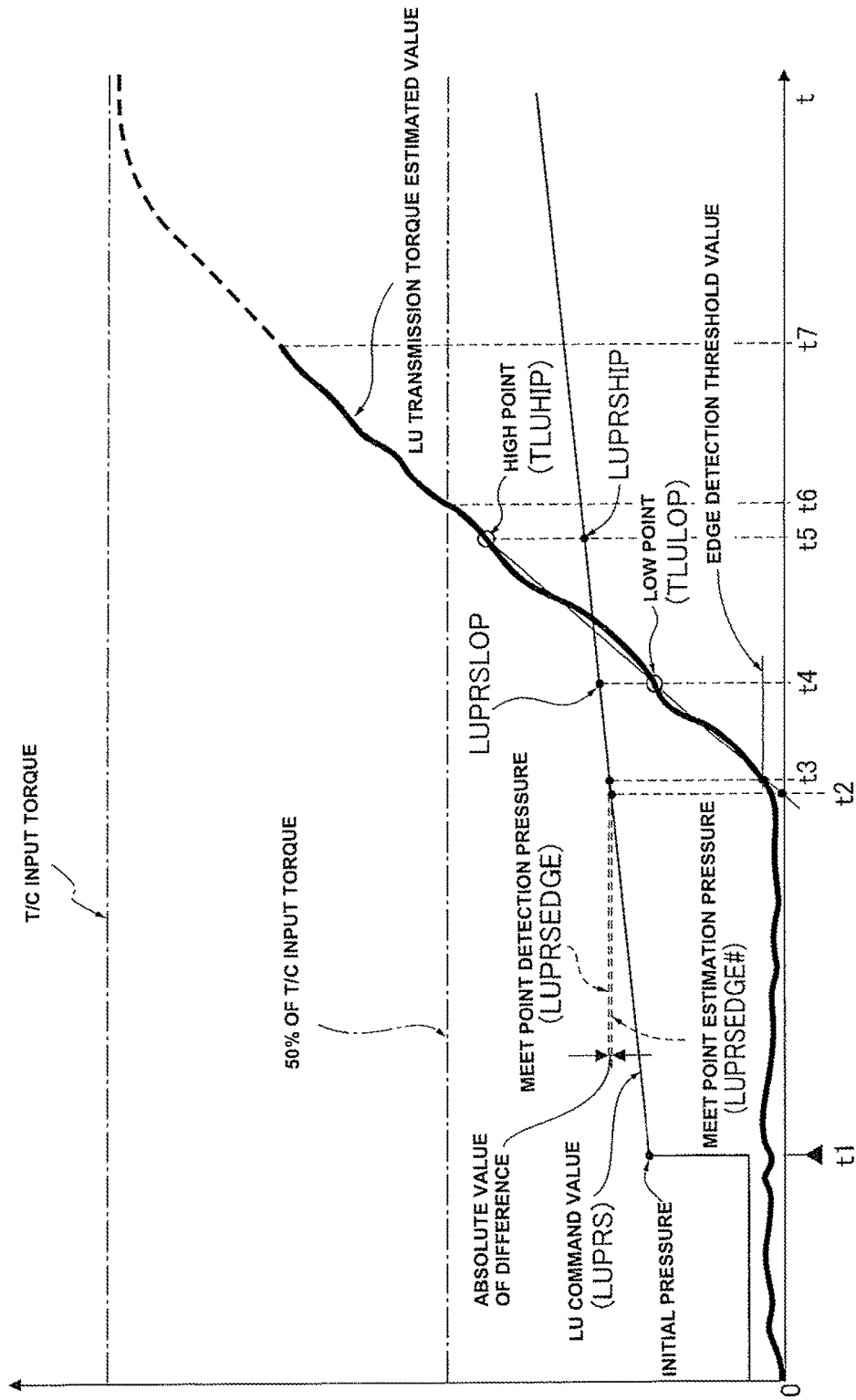
FIG. 6 is a time chart illustrating respective characteristics of a lock-up (LU) command value and a LU transmission torque estimated value, for explaining a meet point detection action at the time when the lock-up clutch moves from a non-engaged state to an engaged state during traveling in the first embodiment.

First, the meet point detection action of the first embodiment is hereunder described in reference to the time chart of FIG. 6. In FIG. 6, the time t1 is an output time of a LU engagement request. The time t2 is a calculation time of the meet point estimation pressure. The time t3 is a determination time of the meet point detection pressure, while the time t4 is a low-point passing time. The time t5 is a high-point passing time. The time t6 is a 50% passing time of the T/C input torque. The time t7 is an engagement completion determination time of lock-up clutch 3. Hereinafter exemplified is the meet point detection action based on the LU transmission torque estimated value when the lock-up clutch 3 is brought into engagement while proportionally increasing a LU command value from the time t1 (LU command value=initial pressure) at which a LU engagement request is outputted.

From the time t1 at which a LU engagement request is outputted, a LU transmission torque estimated value and a variation in LU transmission torque estimated value are calculated. Thereafter, when the variation in LU transmission torque estimated value exceeds an edge detection threshold value at the time t3, a LU command value at the time t3 is stored. By the way, the stored LU command value is set as a meet point detection pressure LUPREDGE when the time t7 (engagement completion determination time) has been reached.

Then, when the low point has been passed at the time t4, the LU transmission torque estimated value TLULOP and the LU command value LUPRSLOP at that time are stored. Furthermore, when the high point has been passed at the time t5, the LU transmission torque estimated value TLUHIP and the LU command value LUPRSHIP at that time are both stored. Immediately after the LU transmission torque estimated value TLUHIP and the LU command value LUPRSHIP have been stored at the time t5, a meet point estimation pressure LUPRSEDGE# is calculated, using the information obtained at the low point, the information at the high point, and the LU command value LUPREDGE. That is, as shown in FIG. 6, the LU command value, at a position corresponding to an intersection point (i.e., the time t2) of an extension line obtained when connecting the low point and the high point and a coordinate line on which the LU transmission torque estimated value is zero, is set as the meet point estimation pressure LUPRSEDGE# at which the lock-up clutch 3 is switched to a torque transmission state.

Immediately after the meet point estimation pressure LUPRSEDGE# has been calculated and it is determined that the learning-value update permission condition has been satisfied, a check is made to determine whether or not a verification result of the meet point detection pressure LUPRSEDGE is valid. That is, as shown in FIG. 6, when the absolute value of the difference between the meet point estimation pressure and the meet point detection pressure is within a specific range from the lower-limit predetermined value to the upper-limit predetermined value, the verification result of a meet point is determined to be valid. And then, when the meet point verification result is determined to be valid, the currently obtained meet point detection pressure LUPRSEDGE is taken into learning-value update processing, and thus the meet point learning value stored through the previous processing is updated. Conversely when the meet point verification result is determined to be invalid, the currently obtained meet point detection pressure LUPRSEDGE is discarded, and thus updating of the meet point learning value is not performed.

Subsequently to the above, the meet point learning control action at the time when the meet point detection pressure LUPRSEDGE (=learning detection value) is taken in as meet point information is hereunder described in reference to the time chart of FIG. 7.

Figure 7:
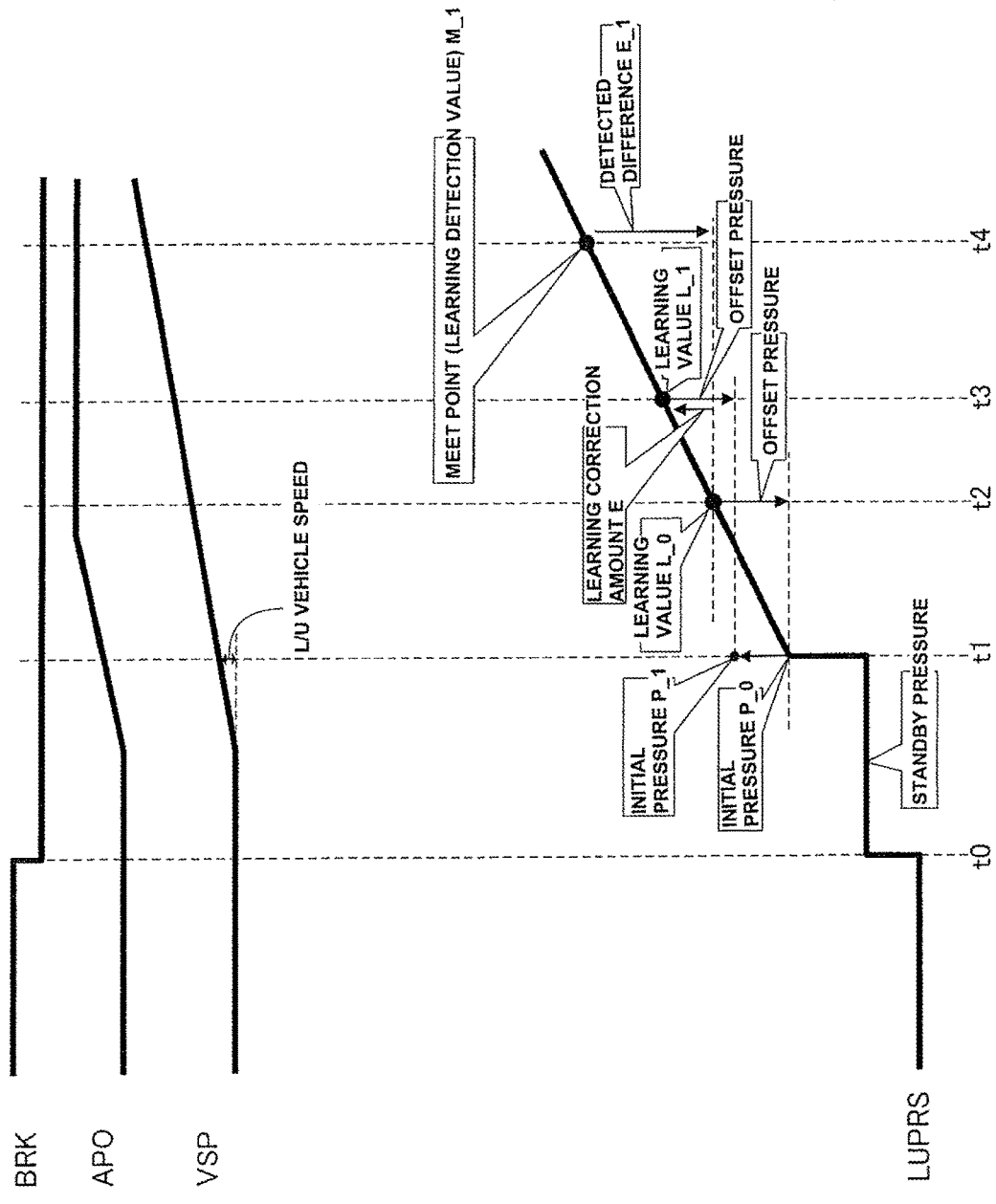
FIG. 7 is a time chart illustrating a meet point learning action at the time when a meet point detection pressure is taken in as meet point information in the first embodiment.

When a brake-off operation is made at the time t0 of FIG. 7, a LU command value (LUPRS) to lock-up clutch 3 is set to a command value for obtaining a standby pressure. When a slight time has elapsed from the time t0 and then the accelerator pedal is depressed (APO>0), the vehicle speed begins to increase. At the time t1 when the vehicle speed VSP reaches a LU vehicle speed, the LU command value (LUPRS) to lock-up clutch 3 is set a command value for obtaining an initial pressure P.

Hereupon, the "standby pressure" is a hydraulic pressure for charging working oil in a lock-up hydraulic circuit in preparation for a start of a clutch stroke of lock-up clutch 3. The standby pressure does not have a lock-up capacity. The "initial pressure P" is a hydraulic pressure given by a stepped-up LU command value such that a clutch stroke of lock-up clutch 3 can be completed within a predetermined time period at the start of LU engagement control. The initial pressure is a hydraulic pressure less than the meet point. The initial pressure does not have a lock-up capacity. The initial pressure P is determined by the following expression.

Initial pressure $P$=Meet point $M$ (=Learning value $L$)−Offset pressure where:

"Learning value L" is set to a value between the upper limit value and the lower limit value of a hard variability range, and the learning initial value is determined by the lower limit value of a hard variability; and "Offset pressure" is a constant (an adaptation value for every accelerator opening) determined depending on how much the initial pressure P should be reduced from the meet point M.

After the time t1, the LU command value to lock-up clutch 3 is increased at a specified gradient (i.e., based on the adaptation value). At this time, assuming that the LU command value (LUPRS) at the time t2 is the existing meet point learning value $L\_0$ stored at the previous processing, while the LU command value (LUPRS) at the time t4 is the meet point $M\_1$ (=learning detection value), the detected difference $E\_1$ is calculated by the following expression.

Detected difference $E\_1$=|Meet point learning value $L\_0$−Meet point $M\_1$ (learning detection value)|

At this time, the detected difference $E\_1$ is greater than the learning correction amount E, that is, $E\_1>E$, a new meet point learning value $L\_1$ is calculated by the following expression.

New meet point learning value $L\_1$=Existing meet point learning value $L\_0$+Learning correction amount $E$ The above new meet point learning value $L\_1$ is set to the LU command value (LUPRS) at the time t3, and thus update processing is performed such that the existing meet point learning value $L\_0$ is rewritten by the new meet point learning value $L\_1$, and then the meet point learning value $L\_1$ is stored as a latest up-to-date meet point learning value.

Therefore, the initial pressure $P\_1$ for subsequent LU engagement control is calculated by the following expression.

Next initial pressure $P\_1$=Meet point learning value $L\_1$−Offset pressure

When the meet point learning value is updated as discussed above and then a LU engagement request for engaging the lock-up clutch 3, which is in a release state, is outputted, the LU command value is stepped up to the next initial pressure $P\_1$, which is calculated by the updated meet point learning value $L\_1$ and the offset pressure. And then, LU engagement control is executed such that the LU command value, which has been increased up to the initial pressure $P\_1$, is increased at the specified gradient capable of suppressing lock-up shocks. By virtue of execution of this LU engagement control, a time period required from the time when the LU engagement request is outputted to the time when the clutch transmission torque is generated can be maintained at a short specified period of time, even in the presence of variations during manufacturing and aging.

Hence, it is possible to ensure a stable engagement responsiveness of lock-up clutch 3.

[Operation Peculiar to Meet Point Learning Control]

According to the configuration of the first embodiment, the LU transmission torque is estimated based on the difference between the engine torque (engine torque signal value Te) and the torque converter transmission torque ($\tau \times Ne^2$) when the lock-up clutch 3 moves from a non-engaged state to an engaged state during traveling of the vehicle. And then, a meet point detection hydraulic pressure LUPREDGE at a time when the lock-up transmission torque estimated value is determined to have entered an upward trend is used as the meet point information for meet point learning control. That is to say, due to engine speed fluctuations during traveling of the vehicle, the transmission torque of torque converter 4 changes and thus the transmission torque of lock-up clutch 3 also changes. In contrast, the meet point detection pressure LUPRSEDGE is a hydraulic pressure at the time when the LU transmission torque estimated value, which is estimated based on the difference between the engine torque (engine torque signal value Te) and the torque converter transmission torque ($\tau \times Ne^2$), has entered an upward trend, that is, a hydraulic pressure such that the transmission torque of lock-up clutch 3 falls no longer. In this manner, the meet point detection pressure LUPRSEDGE at the time when the lock-up transmission torque estimated value is determined to have entered an upward trend is used as the meet point information based on which the learning value L is determined, and hence erroneous learning is prevented. Also, when the lock-up clutch 3 experiences lock-up engagement control that the lock-up clutch 3 moves from a non-engaged state to an engaged state during traveling of the vehicle, meet point learning control processing is initiated. As a result of this, when learning control is performed based on the meet point information at which the lock-up clutch 3 starts torque transmission, erroneous learning can be prevented, while ensuring a learning frequency.

According to the configuration of the first embodiment, when the variation in LU transmission torque estimated value exceeds the edge detection threshold value that represents the start of a monotonic increase in the LU transmission torque estimated value, the lock-up transmission torque estimated value is determined to have entered an upward trend. And then, the LU command value obtained at the determination timing is used or set as the meet point detection pressure LUPRSEDGE. That is, the variation in LU transmission torque estimated value tends to fluctuate (increase and decrease) with a small variation width owing to the influence of engine speed fluctuations, until the lock-up clutch 3 starts toque transmission. Therefore, a specific condition where the variation in LU transmission torque estimated value exceeds the edge detection threshold value that represents the start of a monotonic increase in the LU transmission torque estimated value is used as a determination condition of a clutch meet point. Hereby, there is no possibility that the LU transmission torque estimated value is determined to have entered an upward trend within the increase/decrease change area before lock-up clutch 3 starts torque transmission. Therefore, when determining a meet point at which the lock-up clutch 3 starts to generate a torque capacity, using the LU transmission torque estimated value, the meet point detection pressure LUPRSEDGE can be accurately obtained.

According to the configuration of the first embodiment, the meet point estimation pressure LUPRSEDGE# at which the lock-up clutch 3 starts torque transmission is calculated based on an extension line obtained when connecting the low point and the high point on the build-up characteristic line of the LU transmission torque estimated value. And then, the meet point detection pressure LUPRSEDGE and the meet point estimation pressure LUPRSEDGE# are compared to each other. When the difference between them is less than a predetermined value, the meet point detection pressure LUPRSEDGE is taken in as meet point information based on which the learning value L is obtained. That is to say, the meet point detection pressure LUPRSEDGE may be directly stored as the latest up-to-date learning value of a meet point, but, in determining a clutch meet point by the use of the LU transmission torque estimated value, it is not possible to dispel a possibility of erroneous detection of the meet point detection pressure LUPRSEDGE itself. Therefore, by virtue of a technical approach different from the direct use of meet point detection pressure LUPRSEDGE, that is, by utilizing information on whether the LU transmission torque estimated value indicates a monotonic increase characteristic, the meet point estimation pressure LUPRSEDGE# can be calculated. The calculated meet point estimation pressure LUPRSEDGE# is used as check information (verification information) on whether or not the meet point detection pressure LUPRSEDGE is incorrect. Therefore, in the case of erroneous detection of meet point detection pressure LUPRSEDGE, it is possible to prevent the erroneously detected meet point detection pressure LUPRSEDGE from being taken in as the meet point information for obtaining the learning value L.

According to the configuration of the first embodiment, the low point which has reached a first predetermined ratio with respect to a T/C input torque of lock-up clutch 3 and the high point which has reached a second predetermined ratio greater than the first predetermined ratio are connected. And then, the LU command value corresponding to an intersection point of an extension line of a line segment obtained when connecting them and a coordinate line on which the LU transmission torque estimated value is zero, is set as the meet point estimation pressure LUPRSEDGE# at which the lock-up clutch 3 starts torque transmission. That is, when the LU command value is given as a monotonic increase characteristic, basically, the LU transmission torque estimated value also becomes a monotonic increase characteristic. In the case of a monotonic increase characteristic (a linear function characteristic), a monotonic increase characteristic of the LU transmission torque estimated value can be approximated by drawing a line connecting two points on the characteristic line, deviated from each other. Therefore, by approximating the monotonic increase characteristic of the LU transmission torque estimated value by connecting these two points, it is possible to obtain the meet point estimation pressure LUPRSEDGE# accurately by simple calculation processing.

According to the configuration of the first embodiment, both of the first predetermined ratio and the second predetermined ratio are set less than or equal to 50% of the T/C input torque. That is, when the LU command value is given as a monotonic increase characteristic, an increase characteristic of the LU transmission torque estimated value becomes a monotonic increase characteristic up to approximately 50% of the T/C input torque. Also, the increase characteristic of the LU transmission torque estimated value shifts to a characteristic such that an increase gradient of the LU transmission torque estimated value gradually decreases when exceeding 50% of the T/C input torque. When approximating the characteristic of the LU transmission torque estimated value by connecting two points, by selecting these two points in a specific range within approximately 50% of the T/C input torque, its approximation accuracy can be enhanced or improved. Therefore, by setting both of the first predetermined ratio and the second predetermined ratio less than or equal to 50% of the T/C input torque, the approximation accuracy for the monotonic increase characteristic of the LU transmission torque estimated value can be enhanced. Thus, it is possible to accurately obtain the meet point estimation pressure LUPRSEDGE#.

Next, the effects are explained. The lock-up clutch control device and lock-up clutch control method of the first embodiment, which has been applied to an engine vehicle, can provide the following enumerative effects.

(1) In a vehicle on which a torque converter 4 having a lock-up clutch 3 is mounted between an engine 1 and a transmission (continuously variable transmission 6), the vehicle is provided with a lock-up control means (lock-up controller 12b, see FIG. 3) that performs engagement control for the lock-up clutch 3 and a meet point learning control means (meet point learning controller 12c, see FIGS. 4 and 5) that performs learning control for obtaining a learning value L based on information on a meet point at which the lock-up clutch 3 starts torque transmission. The meet point learning control means (meet point learning controller 12c, see FIGS. 4 and 5) estimates a lock-up transmission torque (LU transmission torque) based on a difference between an engine torque (engine torque signal value Te) and a torque converter transmission torque ($\tau \times Ne^2$) when the lock-up clutch 3 moves from a non-engaged state to an engaged state during traveling of the vehicle (see S1 of FIG. 4), and uses, as the meet point information, a meet point detection pressure LUPRSEDGE at a time when the lock-up transmission torque estimated value (LU transmission torque estimated value) is determined to have entered an upward trend (see S18 of FIG. 5).

(2) The meet point learning control means (meet point learning controller 12c, see FIGS. 4 and 5) determines that the lock-up transmission torque estimated value (LU transmission torque estimated value) has entered an upward trend, when a variation in the lock-up transmission torque estimated value (a variation in LU transmission torque estimated value) exceeds an edge detection threshold value that represents a start of a monotonic increase (see YES at S4 of FIG. 4). Information on a hydraulic pressure (LU command value) obtained at the determination timing is used or set as the meet point detection pressure LUPRSEDGE (see S6 of FIG. 4). Therefore, in addition to the effect of (1), when determining the clutch meet point, using the lock-up transmission torque estimated value (LU transmission torque estimated value), the meet point detection pressure LUPRSEDGE can be accurately obtained.

(3) The meet point learning control means (meet point learning controller 12c, see FIGS. 4 and 5) estimates a meet point estimation pressure LUPRSEDGE# at which the lock-up clutch 3 starts torque transmission, based on an extension line obtained when connecting a plurality of hydraulic points (the low point, the high point) on a build-up characteristic line of the lock-up transmission torque estimated value (LU transmission torque estimated value), compares the meet point detection pressure LUPRSEDGE and the meet point estimation pressure LUPRSEDGE#, and takes the meet point detection pressure LUPRSEDGE in as the meet point information for obtaining the learning value L, when a difference between the meet point detection pressure and the meet point estimation pressure is less than a predetermined value (see the flow of S20→S21→S22 in FIG. 5). Therefore, in addition to the effect of (1) or (2), in the case of erroneous detection of the meet point detection pressure LUPRSEDGE, it is possible to prevent the erroneously detected meet point detection pressure LUPRSEDGE from being taken in as the meet point information for obtaining the learning value L.

(4) The meet point learning control means (meet point learning controller 12c, see FIGS. 4 and 5) connects a first hydraulic point (the low point) which has reached a first predetermined ratio with respect to a torque converter input torque (T/C input torque) of the lock-up clutch 3 and a second hydraulic point (the high point) which has reached a second predetermined ratio greater than the first predetermined ratio, and estimates or sets, as the meet point estimation pressure LUPRSEDGE# at which the lock-up clutch 3 starts torque transmission, information on a hydraulic pressure (LU command value) corresponding to an intersection point of an extension line obtained when connecting the first hydraulic point and the second hydraulic point and a coordinate line on which the lock-up transmission torque estimated value (LU transmission torque estimated value) is zero. Therefore, in addition to the effect of (3), it is possible to obtain the meet point estimation pressure LUPRSEDGE# accurately by simple calculation processing.

(5) The meet point learning control means (meet point learning controller 12c, see FIGS. 4 and 5) sets the first predetermined ratio and the second predetermined ratio less than or equal to 50% of the torque converter input torque (T/C input torque). Therefore, in addition to the effect of (4), the approximation accuracy for the monotonic increase characteristic of the lock-up transmission torque estimated value (LU transmission torque estimated value) can be enhanced, and thus it is possible to accurately obtain the meet point estimation pressure LUPRSEDGE#.

(6) The lock-up control means (lock-up controller 12b, see FIG. 3) calculates an initial pressure P to be supplied to the lock-up clutch 3 by subtracting an offset pressure from the learning value L determined based on the meet point detection pressure LUPRSEDGE, and performs the engagement control for the lock-up clutch 3 by using the calculated initial pressure P. Therefore, in addition to the effects of (1) to (5), a time period required from the time when the LU engagement request is outputted to the time when the clutch transmission torque is generated can be maintained at a short specified period of time, even in the presence of variations during manufacturing and aging, and hence it is possible to ensure a stable engagement responsiveness of lock-up clutch 3.

While the foregoing is a description of the preferred embodiments carried out the invention and explained in reference to the first embodiment, it will be understood that the vehicle lock-up clutch control device and lock-up clutch control method of the invention is not limited to the particular embodiments (the first embodiment) shown and described herein, but that various design changes and modifications may be made without departing from the scope or spirit of this invention.

In the first embodiment, as an example, the meet point learning controller 12c has been configured to use, as meet point information, the meet point detection pressure LUPRSEDGE at which the lock-up clutch 3 starts torque transmission, and perform learning control for obtaining the learning value L of a meet point based on a LU command value. In lieu thereof, the meet point learning controller 12c may be configured to use the meet point detection pressure LUPRSEDGE as meet point information, and perform learning control for obtaining a learning value of an initial pressure based on a LU command value. Furthermore, the meet point learning controller 12c may be configured to perform learning control for obtaining a learning value of a gradient of a LU command value. Moreover, the meet point learning controller 12c may be configured to perform learning control for obtaining both of a learning value of the initial pressure and a learning value of the gradient of the LU command value.

In the first embodiment, as an example, the meet point learning controller 12c has been configured to obtain the learning value L based on the meet point detection pressure LUPRSEDGE, when the verification result based on the meet point estimation pressure LUPRSEDGE# is determined to be valid. In lieu thereof, the meet point learning controller 12c may be configured to perform a verification based on a specific condition other than the meet point estimation pressure, such as a deviation (a rate of divergence) from the existing meet point learning value already stored, and obtain the learning value based on the meet point detection pressure, when the verification result based on the specific condition is determined to be valid. Moreover, the meet point learning controller 12c may be configured such that a learning-value update permission condition is more strictly set and in lieu thereof a verification is omitted, and that the learning value is obtained based on the meet point detection pressure, when the strictly set learning-value update permission condition is met.

In the first embodiment, as an example, the meet point learning controller 12c has been configured to determine, on the assumption that the LU transmission torque estimated value has a monotonic increase characteristic, the monotonic increase characteristic based on information on two points, that is, the high point and the low point, and obtain the meet point estimation pressure LUPRSEDGE#, by the use of the determined monotonic increase characteristic. In lieu thereof, the meet point learning controller 12c may be configured to determine, on the assumption that the LU transmission torque estimated value has a higher-order function characteristic, the higher-order function characteristic based on information on three or more points, and obtain the meet point estimation pressure, by the use of the determined higher-order function characteristic.

In the first embodiment, as an example, the lock-up clutch control device and lock-up clutch control method of the invention is applied to an engine vehicle on which a continuously variable transmission is mounted. In lieu thereof, the lock-up clutch control device and lock-up clutch control method of the invention may be applied to any vehicle on which an engine is mounted as a driving power source, such as a hybrid vehicle. The present invention may be applied to another type of transmission, for example, a stepped automatic transmission whose number of speeds is limited or finite. In other words, the present invention may be applied to a vehicle on which a lock-up clutch equipped torque converter is mounted between an engine and a transmission.

The invention claimed is:

1. In a vehicle on which a torque converter having a lock-up clutch is mounted between an engine and a transmission, a lock-up clutch control device of the vehicle comprises:
    a lock-up controller that performs engagement control for the lock-up clutch; and
    a meet point learning controller that performs learning control for obtaining a learning value based on information on a meet point at which the lock-up clutch starts torque transmission,
    wherein the meet point learning controller estimates a lock-up transmission torque based on a difference between an engine torque and a torque converter transmission torque when the lock-up clutch moves from a non-engaged state to an engaged state during traveling of the vehicle, and uses, as the meet point information, a meet point detection pressure at a time when the lock-up transmission torque estimated value is determined to have entered an upward trend, and
    wherein the meet point learning controller determines that the lock-up transmission torque estimated value has entered the upward trend, when a variation in the lock-up transmission torque estimated value per unit time exceeds an edge detection threshold value that represents a start of a monotonic increase.

2. A lock-up clutch control device of the vehicle as recited in claim 1, wherein:
    the meet point learning controller estimates a meet point estimation pressure at which the lock-up clutch starts torque transmission, based on an extension line obtained when connecting a plurality of hydraulic points on a build-up characteristic line of the lock-up transmission torque estimated value, compares the meet point detection pressure and the meet point estimation pressure, and takes the meet point detection pressure in as the meet point information for obtaining the learning value, when a difference between the meet point detection pressure and the meet point estimation pressure is less than a predetermined value.

3. A lock-up clutch control device of the vehicle as recited in claim 2, wherein:
    the meet point learning controller connects a first hydraulic point which has reached a first predetermined ratio with respect to a torque converter input torque of the lock-up clutch kept in a completely engaged state and a second hydraulic point which has reached a second predetermined ratio greater than the first predetermined ratio, and sets, as the meet point estimation pressure, information on a hydraulic pressure corresponding to an intersection point of an extension line obtained when connecting the first hydraulic point and the second hydraulic point and a coordinate line on which the lock-up transmission torque estimated value is zero.

4. A lock-up clutch control device of the vehicle as recited in claim 3, wherein:
    the meet point learning controller sets the first predetermined ratio and the second predetermined ratio less than or equal to 50% of the torque converter input torque.

5. A lock-up clutch control device of the vehicle as recited in claim 1, wherein:
    the lock-up controller calculates an initial pressure to be supplied to the lock-up clutch by subtracting an offset pressure from the learning value determined based on the meet point detection pressure, and performs the engagement control for the lock-up clutch by using the calculated initial pressure.

6. In a vehicle on which a torque converter having a lock-up clutch is mounted between an engine and a transmission, the vehicle equipped with a lock-up controller that performs engagement control for the lock-up clutch, and a meet point learning controller that performs learning control for obtaining a learning value based on information on a meet point at which the lock-up clutch starts torque transmission, a lock-up clutch control method of the vehicle comprises:
    estimating a lock-up transmission torque based on a difference between an engine torque and a torque converter transmission torque when the lock-up clutch moves from a non-engaged state to an engaged state during traveling of the vehicle;
    using, as the meet point information, a meet point detection pressure at a time when the lock-up transmission torque estimated value is determined to have entered an upward trend; and
    determining that the lock-up transmission torque estimated value has entered the upward trend, when a variation in the lock-up transmission torque estimated value per unit time exceeds an edge detection threshold value that represents a start of a monotonic increase.

* * * * *